UNITED STATES PATENT OFFICE.

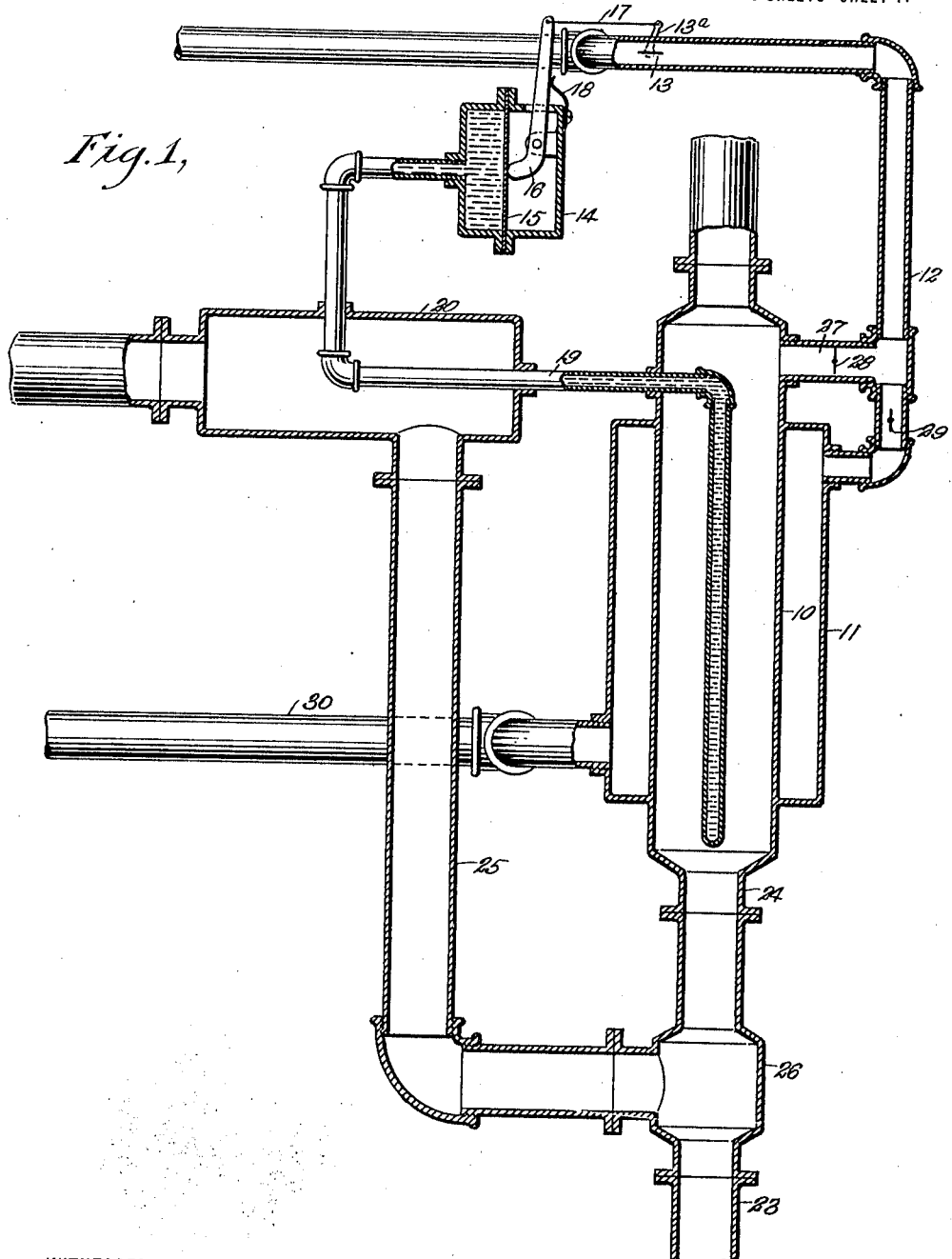

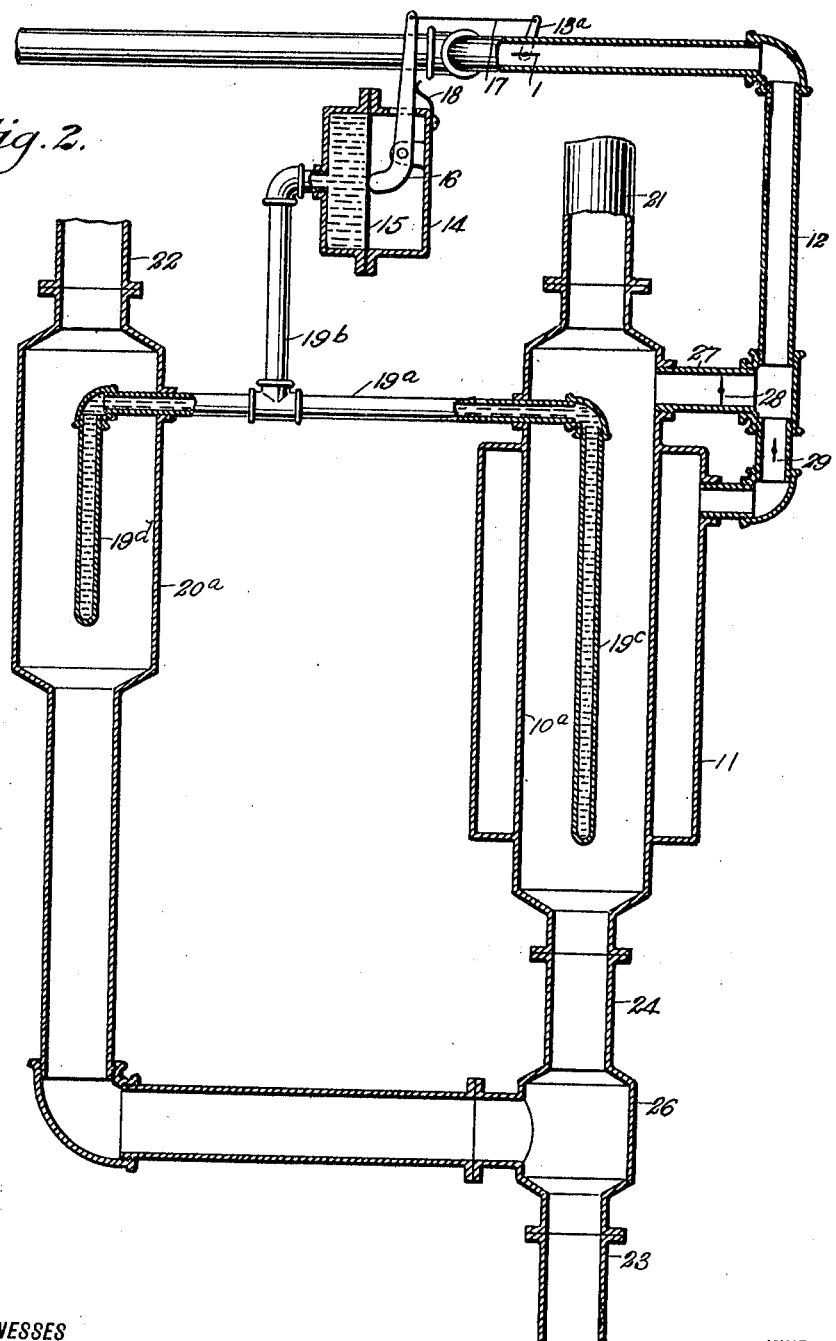

HOWARD BROOKS, OF EL PASO, TEXAS.

TEMPERATURE-REGULATOR.

1,313,938.  Specification of Letters Patent.  Patented Aug. 26, 1919.

Application filed August 28, 1918. Serial No. 251,834.

*To all whom it may concern:*

Be it known that I, HOWARD BROOKS, a citizen of the United States, and a resident of El Paso, in the county of El Paso and State of Texas, temporarily residing in Velardena, Durango, Mexico, have invented a new and Improved Temperature-Regulator, of which the following is a description.

My invention relates to a regulating device for controlling the temperature of fluids, that is to say, either liquids, gases, or air passing through the device. The invention may be employed for regulating the temperature of fluids generally, important instances being the regulation of the temperature of hydro-carbon fuels in their preparation for rapid combustion either in internal combustion engines or in a furnace burning crude oil of a heavy asphaltic base. In the latter case for example, under certain conditions of service the furnace will be much hotter than under other conditions and when the furnace has cooled down and perhaps some of the burners shut off, the heat of the furnace does not offer the same aid to rapid combustion of the fuel that it did when the interior of the furnace was intensely heated, the result being considerable trouble in maintaining proper combustion unless additional heat is supplied to the fuel oil and burners. The prevailing practice is to provide maximum heat to the fuel at all times, in order to provide for the proper action of the burners under minimum demand and this causes considerable heat loss under normal operating conditions because normal or maximum demands generally are far in excess of the minimum demands. Similarly, the heat conditions developed in internal combustion engines vary with the load demands, the maximum load demands not requiring a fuel so highly heated as under minimum load conditions.

The general object of my invention therefore is to automatically regulate the temperature of the fuel according to varying operating conditions with respect to heat. The stated object is attained by causing the fluid to flow through separate passages to a common discharge, and under different heat conditions and regulating the heat of the fluid in one of the passages through means controlled by a heat-responsive device subject to the individual temperatures of the separate fluids, so that the regulating means is controlled by the mean temperature of the differently heated fluids flowing to the common discharge.

Reference is to be had to the accompanying drawings forming a part of this specification, it being understood that the drawings are merely illustrative of practical examples of the invention.

Figure 1 is a sectional side elevation of a fluid-heating and regulating means embodying my invention;

Fig. 2 is a similar view showing a somewhat different form of the thermostatic element employed.

In carrying out my invention, a tube 10 constitutes one passage for fluid and is provided with a jacket 11 for a heating or cooling medium as the case may be according to the character of the temperature interchange to be brought about. Said jacket is adapted to be supplied with a heating or cooling medium from an inlet pipe 12 having a valve 13 controlling the same for regulating the passage of the inlet, said valve being controlled by a heat-responsive device here represented as in the form of a diaphragm thermostat designated generally by the numeral 14. To actuate the valve 13 in the given example, the diaphragm 15 of the thermostat 14 acts on the short arm of a lever 16, the long arm of which connects as by a wire or cord 17 with the crank handle 17ᵃ of the valve. The lever 16 is subject to a spring 18 acting in opposition to the diaphragm 15.

A second passage for the flow of fluid to be heated is provided separate from that formed by the tube 10, there being shown conventionally a tube 20 for the purpose. The tube 10 has an inlet 21 and the tube 20 its individual inlet 22. The fluid flowing through both passages issues from a common discharge 23 which connects with the outlet 24 of the tube 10 through the medium of a T 26 or other chamber and the outlet 25 of the second tube 20 delivers likewise to the chamber provided by said T.

The jacketed tube 10 being subject to the heating or cooling medium passing through the jacket will result in the fuel or other fluid having a different temperature from that passing through the passage formed by the tube 20 and I cause the respective fluids to have a counteracting effect on a thermostat or equivalent heat-responsive device so that the latter will be effectively influenced by the mean temperature of the two fluids. In the form shown in Fig. 1 a tube 19 containing mercury or like thermostatic element communicates with the mercury chamber of the thermostat 14. Said tube 19 extends through the tube 20 and has its closed end disposed in the tube 10. Thus, the tube 19 will be subjected separately to the fluids flowing toward the discharge, 23. It will be readily understood that by regulating the heating or cooling medium supplied to the jacket 11 the temperature of the fluid passing through the tube 10 may be caused to determine the final temperature of the mingled fuel issuing from the discharge 23 and the extent to which the thermostatic element in the tube 19 may function to affect the valve 13 will depend upon the percentage of the area of said tube 19 exposed to the action of the fluids in the respective tubes 10 and 20. Therefore, the installation may be such as to produce a predetermined temperature of the fluid issuing from the discharge 23, that is to say, the device may be so installed with respect to the proportion of the tube 19 in the tubes 10 and 20 that the issuing fluid will have for example a temperature of 175° with a given area of said tube 19 in the cooler tube 20, and by decreasing the area of the tube 19 in the tube 20 the temperature of the fluid issuing from the discharge 23 may be reduced. The tube 10 may be considered a primary tube and the tube 20 a secondary tube because the former carries the principal or more constant volume of fluid at a more or less constant temperature which we will take as being 175°. The fluid flows through tube 20 in greatly varying quantities and when so flowing the temperature at the discharge 23 is required to be reduced, say to 150°. When the tube 20 is passing its full capacity the temperature at the discharge 23 will vary between 150° and 175° according to the volume of fluid flowing from the tube 20 into the chamber 26 and discharge 23, the operation being as follows: The main fluid is passing through the tube 10 to the discharge and heat for example is being supplied to the jacket 11 through the inlet 12 and valve 13, and the heat is under control of the thermostat 14 to admit more or less of the heating medium into the pipe 12 and jacket 11. Assuming normally in operation the parts 10 to 14 and that the discharge has a temperature of 175°, we will now start a flow of fluid through the tube 20 to the chamber 26 and discharge 23; thus fluid flowing past that portion of the tube 19 exposed in the tube 20 will either contract or expand the mercury or other thermostatic element in said tube 19 according to the temperature of the flow through the tube 20 and the effect of the expansion or contraction of the thermostatic element in tube 19 will be in proportion to the exposed area of said tube, and it is evident that if we are passing a fluid through the tube 20 that is colder than that flowing past that portion of the tube 19 exposed in the tube 10, we will cause a contraction of the fluid in the tube 19 where it passes through the tube 20 and thus the contraction of the thermostatic fluid will permit the diaphragm 15 to depress and open to a greater extent the valve 14 which will admit more of the heating medium through the inlet 12 and jacket 11, thus increasing the temperature of the fluid passing through tube 10, and that the combined discharge of the tubes 10 and 20 will then have a temperature which is due to the temperature effect of the fluids flowing through the tubes 10 and 20. It is also evident that if the tube 19 containing the thermostatic element has a less percentage of its total area exposed to the effect of temperature changes in tube 20 than is exposed to temperature changes in tube 10, that the effect on the expansible fluid of the tube 19 exposed in the tube 20 will not be sufficient to cause enough contraction in that portion of the tube 19 exposed in the tube 20 to counteract and balance the expansion of the thermostatic fluid in the tube 19 exposed to temperature changes in tube 10. This results in an unbalanced effect upon the thermostatic diaphragm 15 which, upon the whole, will be depressed on account of the contraction of the expansible fluid in tube 19 and will move the valve 13 to a more open position to thus increase the temperature of the jacket 11 which in turn raises the temperature of the fluid flowing through tube 10 to such an extent that they compensate to a degree the entrance or flow of the colder fluid delivered by the tube 20 and this compensation is more or less in proportion to the percentage of the tube 19 exposed in the respective tubes 10 and 20 as explained above. Thus, the temperature of the discharge of the mingled fluids will approximately be in proportion to the percentage that the tube 19 exposed in tube 20 bears to the exposure of said tube 19 in the tube 10, when the device is operating under normal conditions and within the limits for which it is designed.

In the form shown in Fig. 2, the elements described are the same as in Fig. 1 except as to tube 19$^a$ corresponding with tube 19. Said tube 19$^a$ extends at opposite sides of the branch 19$^b$ connecting it with the mercury chamber of the thermostat 14 and terminates in two legs or branches depending in the respective tubes 10$^a$ and 20$^a$ corresponding essentially with the tubes 10 and 20 and having essentially the same relation to the discharge 23 and the mixing chamber 26. The two closed ends 19$^c$, 19$^d$ in the form shown in Fig. 2 permit of readily making up the tube 19ª to suit given requirements of heat regulation.

In both forms of the invention I may connect the inlet 12 with the interior of the primary tube 10 or 10ª through the medium of a by-pass 27 having a cut-off valve 28, there being a similar cut-off valve 29 in the inlet 12 between the by-pass 27 and the jacket 11. Thus, by closing the valve 28 and opening the valve 29 the heating or cooling fluid from the inlet 12 will pass directly into the tube 10 or 10ª which will be feasible when the heating fluid from the inlet 12 is of the same character as the fluids passing through the tubes 10 and 20, or 10ª or 20ª.

I would state in conclusion that while the illustrated examples constitute practical embodiments of my invention, I do not limit myself strictly to the mechanical details herein illustrated since manifestly the same can be considerably varied without departure from the spirit of the invention as defined in the appended claims.

Having thus described my invention, I claim as new, and desire to secure by Letters Patent:

1. A temperature regulator for fluids, including separate passages for the flow of the fluid to be regulated, and a common discharge therefor; together with means for modifying the temperature of one of the passages and a heat-responsive device subject to the individual temperatures of the separate passages and controlling said means.

2. A temperature regulator having separate passages for the flow of fluid to be regulated, a chamber to which said passages deliver in common, and means for regulating the temperature of the fluid in one passage and controlled by the mean temperature of said passages.

3. In a temperature regulator for fluids, separate passages for the flow of the fluid to be regulated, a common discharge therefor, means for modifying the temperature of the fluid in one of the passages, and a heat-responsive device subject to the individual temperatures of the separate fluids in said passages and controlling said means.

4. A temperature regulator for fluids, including separate passages for the flow of the fluid to be regulated a discharge common to said passages, means for modifying the temperature of the fluid in one of the passages, and a thermostat controlling said means, said thermostat including a tube containing an expansible fluid and presenting closed ends disposed respectively in said passages.

HOWARD BROOKS.